Dec. 10, 1968   M. M. McQUEEN ETAL   3,415,118
FLUID GAUGING SYSTEM
Filed May 12, 1966
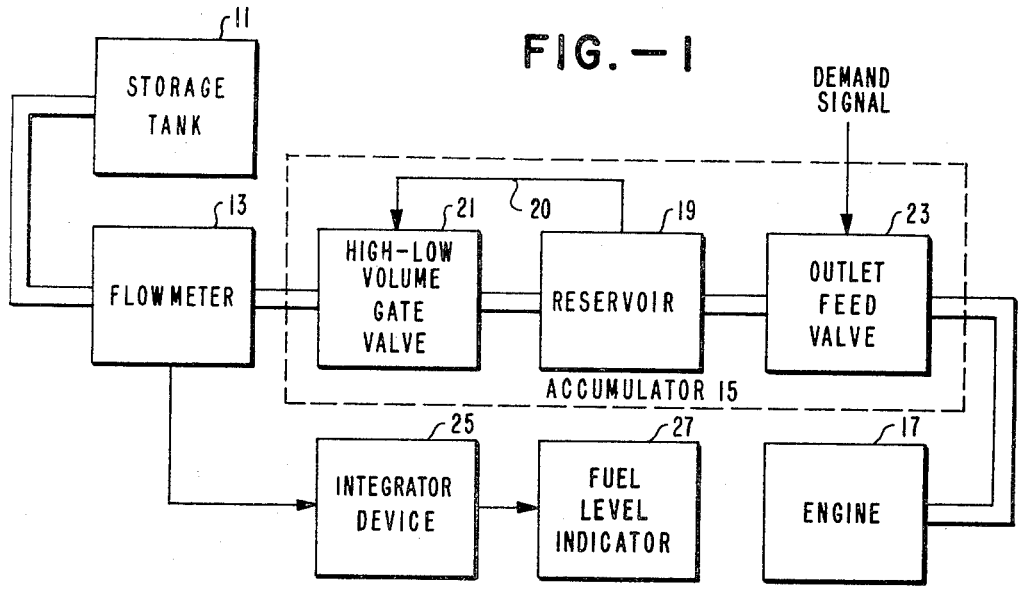
FIG.—1
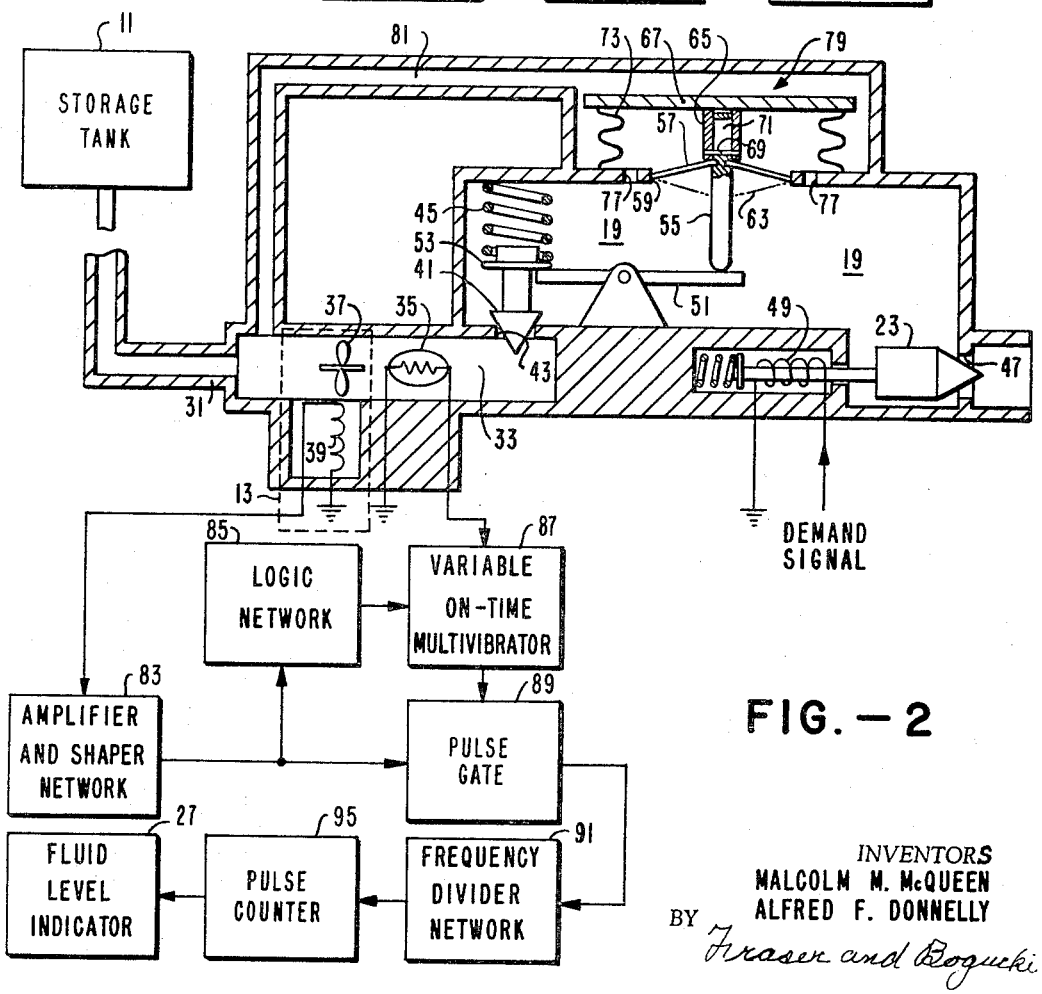
FIG.—2
INVENTORS
MALCOLM M. McQUEEN
ALFRED F. DONNELLY
BY Fraser and Bogucki
ATTORNEYS

3,415,118
FLUID GAUGING SYSTEM
Malcolm M. McQueen, Northridge, and Alfred F. Donnelly, Thousand Oaks, Calif., assignors to Whittaker Corporation, Los Angeles, Calif., a corporation of California
Filed May 12, 1966, Ser. No. 549,638
10 Claims. (Cl. 73—199)

ABSTRACT OF THE DISCLOSURE

The fuel flow rate through a flowmeter is maintained constant during filling of a downstream reservoir by the action of a toggle operated gate valve. The downstream reservoir has a variable volume defined by a movable fluid tight partition that divides a fixed volume enclosure. The oppositely variable volume on the opposite side of the partition is connected to be filled by fluid upstream of the flowmeter. Once filled, the downstream reservoir discharges the fluid contained therein on demand to an outlet or utilization device until the volume has decreased to a level where the position of the partition snaps open the gate valve to produce a sustained flow of fluid through the flowmeter to refill the reservoir. When the reservoir is filled, the position of the partition causes the gate valve to close, stopping flow through the flowmeter. The flowmeter generates pulses in proportion to the measured rate, and a selected proportion of the pulses generated are passed by a gating circuit to an integrator or accumulator under the control of a temperature sensitive circuit.

---

This invention relates to systems for measuring fluid flow quantities and more specifically to fluid quantity gauging systems for providing more accurate measurements of the volume or mass of liquids flowing at irregular rates.

Although the present invention involves equipment which may be useful in any flow measuring system, it is particularly useful in aircraft or spacecraft for gauging liquid fuel quantities where flow rates and liquid densities may vary considerably. In spacecraft, for example, liquid fuel flow to vector thrust engines may vary over wide ranges and often occurs erratically in intermittent pulses. In such situations, accurate gauging of the remaining fuel available is often critical in deciding whether to perform further maneuvers, but such accuracy is made considerably more difficult by the erratic nature of the flow being measured.

Previous fuel gauging systems have commonly employed impeller wheel type flowmeters disposed in the fuel line between the fuel storage tank and the engine or other fuel utilization device. The flow of liquid fuel turns the impeller wheel at a speed proportional to the flow rate, and the volume of this flow is gauged simply by counting the total number of impeller wheel rotations, which is proportional to the total flow volume. The amount of fuel remaining is then gauged by subtracting the measured volume of flow from the original volume stored in the fuel storage tank. Although these impeller wheel flowmeters are accurate enough for steady intermediate flow rates, they are inherently inaccurate in measuring liquid volumes over a wide range of flow rates, particularly if the flow is very rapid or slow, or intermittent. With very rapid flow the impeller wheel may not be able to rotate rapidly enough because of cavitation and other high speed flow effects. On the other hand, very slow flow rates, such as that produced by leakage, may not exert sufficient turning force against the impeller blades. With intermittent pulse flows, the impeller wheel is unable to accelerate and decelerate fast enough to follow the rapid and frequent step increases and decreases in flow rate accurately.

However, even if the volume of flow is measured accurately, density variation in the liquid fuel due to temperature changes can severely limit the accuracy of gauging the amount of fuel remaining, particularly in spacecraft which are subjected to severe temperature changes. Therefore, merely subtracting the volume of flow measured by the flowmeter from the initial volume of fuel without compensating for density variation could result in serious miscalculations in determining the amount of fuel available. To avoid such inaccuracies where impeller wheel type flowmeters are used, the count of impeller wheel rotations must be continuously compensated for density changes in the liquid flow being measured.

Accordingly, it is an object of this invention to provide a more accurate fluid flow gauging or measuring system for measuring the amount of fluid transferred at widely varying flow rates and densities.

Another object of this invention is to provide a fluid gauging system having high accuracy in measuring the amount of flow during very slow and intermittent flow conditions.

A further object of this invention is to provide a fluid volume gauging system capable of supplying fluid from a source at a variety of flow rates while providing sustained flow through a flowmeter at a rate within a narrow range of flow rates where the flowmeter is most accurate.

Yet another object of the present invention is to provide an improved inexpensive liquid gauging system for use in spacecraft and the like.

Yet another object of the present invention is to provide an improved fluid gauging system using a flowmeter wherein compensations are automatically made for changes in the density of the fluid.

These and other objects are accomplished in accordance with the invention by providing a fluid flow measuring device to restrict the fluid flow rate through a flow rate meter within the narrow range at which the greatest accuracy is achieved. Flow rates too high or too low to permit accurate measurement by the meter are eliminated, as are extremely short transient flow rates of whatever magnitude.

In a preferred embodiment of the present invention, an accumulator device is located in the flow path between an impeller wheel flowmeter and an engine or other fluid utilizing device. The accumulator operates to produce sustained flows through the impeller wheel at a rate above a predetermined threshold level. The fluid passed through the meter is temporarily stored in a reservoir from which it is released through an outlet feed valve to the engine on demand. Thus the accumulator acts as a flow rate buffer between the tank and the engine to eliminate erratic and widely varying rates of flow through the meter resulting from a variable demand rate for the engine.

The sustained flow through the meter into the reservoir is produced by the action of a high-low volume gate valve which is responsive to the fluid level in the reservoir. When the fluid volume stored in the reservoir reaches a predetermined lower level, the high-low volume gate valve is opened to draw fluid from the tank at a sustained flow rate through the meter to refill the reservoir. The sustained flow rate above the predetermined threshold continues until the fluid volume in the reservoir reaches an upper level, at which time the gate valve is closed.

In accordance with the more particular aspects of a preferred embodiment of this invention, a spring-loaded bellows arrangement forms a portion of a fluid reservoir having a storage volume which is varied between predetermined high and low levels by expansion and contraction of the bellows. Liquid flow into the reservoir passes through a flowmeter and is regulated by opening and closing an inlet valve in accordance with the expansion and contraction of the bellows. On the other hand, liquid flow is regulated by an outlet valve upon demand from the reservoir. As liquid is removed from the reservoir through the outlet valve, the bellows moves to follow the decrease in the liquid volume within the reservoir. When the liquid volume in the reservoir reaches the predetermined low level, the bellows causes the inlet valve, which is held in a normally closed position, to open to admit additional liquid to the reservoir. The bellows then moves under the spring loading force to expand the reservoir volume, and liquid flows through the open inlet valve and the flowmeter to keep the expanding volume of the reservoir full. When the predetermined high volume of the reservoir is reached, the bellows causes the inlet valve to close. Thus the inlet valve is held open for a prolonged interval while a susbtantial volume of liquid, at least equal to the difference between the predetermined high and low levels, flows at a sustained rate through the flowmeter in spite of irregularities in the demand rate.

In accordance with another particular aspect of the invention, the flow of liquid into the reservoir is measured by an impeller wheel type flowmeter. Magnetic poles in the blade tips of the impeller wheel rotate past an adjacent sensing coil to generate electrical pulses, the frequency of which depends on the rotational speed of the impeller wheel, which in turn is directly related to the flow rate. Thus the total number of pulses generated during any interval is proportional to the total volume of flow during that interval, and by merely counting the pulses a relatively accurate indication of the total volume of liquid flow can be obtained. However, since liquid density usually varies with temperature change, particularly over the extreme ranges encounterd in spacecraft, merely subtracting the total liquid volume through the flowmeter from the original storage volume would not provide a reliable indication of the amount remaining in storage. In order to avoid such inaccuracies, a circuit is provided in accordance with the invention to compensate for density variations resulting from temperature changes and other variables. The pulses generated in the sensing coil during rotation of the impeller wheel are applied to the input of a pulse gate circuit that is controlled by a multivibrator. The gate circuit blocks the pulses applied to its input when the multivibrator is on, and allows them to pass during the time that the multivibrator is off. A temperature sensor disposed in the flow path responds to the temperature of the liquid flowing through the impeller wheel and provides a control signal for regulating the on-time of the multivibrator, while the off-time during each multivibrator cycle is maintained constant. As the temperature increases, the multivibrator on-time is increased accordingly so that the percentage of pulses blocked during any given period of time varies in proportion to the variation in the density of the measured liquid. The on-time of the multivibrator can also be set to compensate for other system variables that affect accuracy, such as variations from a nominal center pulse frequency generated by the flowmeter and the initial density of the stored liquid. Pulses passed by the gate are then counted to be subtracted from an initial count representing the total volume initially stored to provide an output indicative of the amount of liquid remaining in the tanks.

These and other aspects of the invention can best be understood and appreciated with the following detailed description taken in conjunction with the accompanying drawings:

FIG. 1 is a schematic block diagram illustrating the basic functional components of the improved liquid volume gauging system in accordance with the invention; and FIG. 2 is a simplified schematic diagram of the invention including a side-sectional view of the liquid handling components and a block diagram of the circuits employed therewith.

Referring now to FIG. 1, a liquid flows under pressure from a storage tank 11 through a flowmeter 13 into an accumulator 15, and from there to an engine 17 or other utilization device on demand. The accumulator consists of a reservoir 19 for temporarily storing liquid passed through the flowmeter 13, a high-low volume gate valve 21 for selectively admitting liquid to the reservoir 19 thereby regulating flow through the flowmeter 13, and an outlet feed valve 23 for supplying liquid to the engine on demand. The high-low volume gate valve 21 operates automatically in accordance with the volume level in the reservoir 19, as indicated by the control connection 20. The valve 21 opens to fill the reservoir 19 when the fluid volume stored in the reservoir reaches a predetermined low level and then closes when the resrvoir has been filled to a predetermined high level. Thus the high-low volume gate valve 21 is held open to produce a sustained flow through the flowmeter 13 at a relatively constant rate for a substantial interval, independent of irregularities in the demand. The flowmeter 13, preferably of the impeller wheel type, measures the flow during each interval, and a cumulative total is obtained by an appropriate integrator device 25 to operate a fuel level indicator 27. The indicator 27 may be preset to indicate the initial volume stored in the tank 11, and thereafter the total from the integrator is subtracted to provide a reading indicative of the amount of fuel remaining in the tank.

Referring now to FIG. 2, which illustrates in more detail certain features of a preferred embodiment of the invention, liquid fuel initially stored in the tank 11 enters a measuring chamber 33 containing the flowmeter 13 (shown in dotted line) and a temperature sensor 35. The flowmeter 13 consists of an impeller wheel 37 rotatably positioned in the flow path through the measuring chamber 33, and an inductive sensing coil 39 positioned adjacent the impeller wheel so that magnetic poles in the tips of the impeller wheel blades induce pulses in the coil as they rotate past. A reservoir inlet valve 41 is normally urged into a closed position against its seat 43 by a spring 45 to prevent fluid flow from the chamber 33 into the reservoir 19. The solenoid operated outlet feed valve 23 regulates flow from the reservoir 19 through its outlet valve seat 47 to the engine 17 (shown in FIG. 1) in accordance with external demand signals applied to the actuating coil of its actuating solenoid 49.

One end of a centrally pivoted lever or rocker arm 51 is disposed in contact with the underside of a flange 53 on the stem of the reservoir inlet valve 41, while the other end of the arm 51 is in contact with the base of a vertically movable plunger 55. Downward movement of the plunger 55 against one end of the arm 51 causes the other end to bear upwards against the flange 53 to lift the valve 41 free of its seat 43 against the force of the bias spring 45. The plunger 55 is attached to the center of a snap action Belleville washer 57 mounted within an aperture 59 formed in the top wall of the reservoir 19. The Belleville washer 57 is capable of being sprung between alternative upper and lower positions (the lower position being indicated in FIG. 2 by the dashed line 63) to open and close the reservoir inlet valve 41. With the Belleville washer 57 sprung to its upper position as shown in FIG. 2, the valve 41 is held fully closed against its seat 43 by the force of the spring 45. On the other hand, when the washer 57 springs to its lower position, the reservoir inlet valve 41 is lifted by the arm 51 to a fully open position.

The upper end of the plunger 55 is slidably received within a tubular collar fitting 65 which is attached to a movable pressure plate 67, and a pin 69 attached within the collar 65 passes through a vertical slot 71 formed on the plunger 55. The length of the slot is equal to or larger than the vertical distance moved by the plunger between the alternative upper and lower positions of the Belleville washer 57 so that the pressure plate 67 is free to move independently of the plunger 55 between certain limits defined by the length of the slot 71. A flexible bellows 73 is attached between the periphery of the pressure plate 67 and the upper surface of the container wall surrounding the aperture 59 to enclose a substantial volume of fluid. The flexible bellows 73 is provided with a spring-like resiliency to exert an upward force on the pressure plate 67 tending to expand the enclosed volume. The volume of liquid confined by the bellows 73 and the pressure plate 67 communicates freely with the liquid in the remainder of the reservoir 19 through ports 77 provided in the top wall of the reservoir structure just beyond the periphery of the aperture 59.

In accordance with this preferred embodiment, the fluid pressure within the reservoir applied to the interior surfaces of the bellow 73 and the attached pressure plate 67 is opposed by a similar fluid pressure on the outer surfaces. To accomplish this, the containing walls of the reservoir extend to form an upper fluid chamber surrounding the bellows arrangement. Thus, the bellows arrangement in effect forms a movable fluid-tight partition between the upper chamber and the lower reservoir chamber 19 so that as the volume of one expands the volume of the other contracts. The upper chamber 79 is connected by means of a conduit 81 to a point adjacent the inlet to the measuring chamber 33, that is, upstream of the impeller wheel 37, so that the fluid pressure within the chamber 79 is the same as that at which the fluid is being received from the storage tank 11. When the reservoir inlet valve 41 is open, this pressure within the upper chamber 79 is slightly greater than that within the reservoir chamber 19 due to the small pressure drop across the impeller wheel 37 and the inlet valve. Accordingly, there will exist a net pressure force on the pressure plate 67 tending to urge it downward against the upward spring force of the bellows 73. The spring force of the bellows 73 is made substantially larger than the combination of the net downward force created on the pressure plate 67 due to the pressure differential when the inlet valve 41 is open and of the slight additional force needed to snap the Belleville washer 57 from the upper to the lower position.

In operation, as the fluid volume within the reservoir 19 is reduced, the pressure on the underside of the pressure plate 67 decreases to a point where the inlet pressure applied on the upper side produces a net force in the downward direction sufficient to overcome the upward spring force of the bellows 73. The bellows 73 thus contracts moving the pressure plate 67 downward to follow the change in fluid level. This downward motion continues until the pin 69 contacts the lower extent of the plunger slot 71 where further downward movement is resisted by the force of the Belleville washer 57. As the flow out of the reservoir continues, the pressure drop across the pressure plate 67 increases until sufficient to snap the Belleville washer 57 through center. As the Belleville washer 57 snaps to the lower position, the plunger 55 pushes the adjacent end of the lever arm 51 down to open the inlet valve 41 to restore the full fluid pressure within the reservoir 19 so that the spring force of the bellows 73 forces the pressure plate 67 upwards. The expansion of the bellows 73 forces fluid out of the measuring chamber 33 to fill the reservoir 19. The upward expansion continues until the pin 69 reaches the upper end of the slot 71, at which time the spring force of the bellows 73 is sufficient to overcome the resistance of the Belleville washer 57 to snap it back to its upper position, thus allowing the inlet valve 41 to close. Accordingly, the inlet valve 41 is held open for a prolonged interval to maintain a sustained flow rate through the measuring chamber 33 as the reservoir 19 is refilled, in spite of irregular demand or widely varying flow rates through the outlet valve 23. The accumulator arrangement thus serves as an effective flow rate buffer between the storage tank 11 and the engine 17 to reduce the range of flow rates through the flowmeter 13. For example, in one practical application, the flow rates demanded by the engine 17 varied over a range of 10:1 while a range of approximately 2:1 was maintained through the flowmeter 13, thus achieving a substantial increase in the accuracy of the flowmeter. One of the major sources of inaccuracies in previous fuel gauging systems using flowmeters resulted from leaks in the fluid handling system. A slow leak could result in the loss of considerable fluid over an extended period without producing a measurable flow rate through the flowmeter. However, with this invention, such inaccuracies are minimized by locating the gauging system as close as possible to the storage tank outlet, since the volume of even the slowest downstream leakage can be measured. The particular results achieved in this respect will depend upon various design considerations which will be obvious to those skilled in the art.

Although the total volume of flow through the flowmeter 13 can be accurately gauged by means of the accumulator 15, the accurate gauging of the remaining fuel supply in the storage tank 11 is complicated by certain practical considerations. In the ideal situation where the density of the fluid remains constant and the impeller wheel 37 rotates at a known rate for a given flow rate, it is easy to calculate the total number of impeller wheel rotations required to empty a known volume from the storage tank. However, most fluids, including the liquid fuels and oxidizers used in spacecraft, are subject to substantial density variations due to temperature and pressure changes. While holding fluid pressure constant is usually a relatively simple matter, maintaining constant temperature, particularly in the extreme temperature environments of spacecraft, can be much more difficult. In addition, impeller wheel type flowmeters seldom have impeller wheels that rotate at an exact predetermined speed for a given flow rate. Therefore, the degree of accuracy of the gauging system depends upon the extent to which these different system variables are taken into consideration.

In the impeller wheel type flowmeters of the type shown, the speed of rotation of the impeller wheel 37 and thus the frequency of the pulses from the sensing coil 39 are directly proportional to the flow rate through the sensing chamber 33. The pulses generated in sensing coil 39 are irregularly shaped and may have a duration of only a few microseconds each. Since such irregularly shaped pulses are difficult to detect and count with any degree of reliability, they are initially fed to an amplifier and shaper network 83 that transforms the irregular pulses to square or other regularly shaped pulse waveforms. These pulses are then applied to a logic network 85 that serves to activate a variable on-time multivibrator 87, and also to the input of a normally closed pulse gate 89 which is controlled by the multivibrator 87. When the multivibrator 87 is off, no pulses are allowed to pass through the gate 89 and, when the multivibrator is on, the gate 89 is opened to pass the pulses to a frequency divider network 91. The variable on-time multivibrator 87 constitutes a conventional monostable circuit capable of being actuated by a signal from the logic network 85 to cycle between an "on" state and an "off" state. During each cycle of its operation, the multivibrator 87 remains off for a fixed period of time before switching on for a variable period of time determined by certain system parameters. Each on-off cycle of the multivibrator 87 should be many times larger than the maximum expected pulse interval, but should also be many times smaller than the minimum interval during which the accumulator 15 maintains a sustained flow through the flowmeter. This permits selected proportion of the total number of pulses generated to be passed by the gate 89 to a frequency divider network 91 and then to a pulse counter 95.

The frequency divider network 91 produces an output pulse for a given number of input pulses passed by the gate 89, so that the high frequency of the pulses produced by the flowmeter 13 to a proportional smaller number of low frequency pulses to which the counter 95 and the fluid level indicator devices 27 can respond. The ratio between output and input pulses is determined by dividing the total number of pulses generated during a complete emptying of the tank minus the number of blocked pulses in the gate 89 by the total number of pulses necessary for the fluid level indictor 27 to count from full scale to zero. The fluid level indicator 27 responds to the increasing count in the pulse counter 95 by moving downward from full scale to zero as the fuel supply in the storage tank 11 is used.

In practice, the storage tank 11 is initially filled with fluid to some desired level usually to maximum capacity. Since the storage tank 11 may be filled under environmental conditions of varying pressure and temperature, the fluid mass stored in a given volume varies with the density. The total pulse count needed to cause the fluid level indicator 27 to move from full scale to zero is fixed. Also, it is known that the impeller wheel 37 is supposed to rotate at a precise speed for any given flow rate within the desired range, but for any given flowmeter the actual proportion between the flow rate and the speed of rotation of the impeller wheel may differ considerably from that desired. Thus, the flowmeter 13 must be tested prior to use to determine the actual pulse output frequency at a given flow rate to be compared with the nominal pulse frequency which the flowmeter 13 should produce at this flow rate. The information as to the initial density of the fluid stored and the operation of the flowmeter 13 is then used for making an initial adjustment to the variable on-time multivibrator 87 so that the total number of pulses reaching the counter 95 during emptying of the storage tank 11 will cause the fluid level indicator 27 to move from full scale to zero. After this initial correction is made, the temperature sensing element 35, such as a thermistor disposed in the fluid flow path adjacent the impeller wheel 37, is connected to adjust the on-time of the multivibrator 87 continuously from the initial setting to compensate for further changes in density of the fluid. These corrections adjustment in the on-time of the multivibrator are made by appropriate changes in the parameters of the multivibrator circuit, and may be accomplished either electrically, such as by varying the bias voltage on one of the electronic elements in the multivibrator, or mechanically, such as by varying the impedance of one of the circuit elements determinative of the associated time constant in the circuit.

Although a preferred embodiment in accordance with the invention has been described and illustrated herein, it will be appreciated that various changes, modifications and equivalent arrangements other than those specifically mentioned herein may be employed, without departing from the spirit or scope of the invention as expressed in the appended claims.

What is claimed is:
1. A system for determining the amount of fluid flow past a given point in a fluid handling system comprising:
   means for measuring the rate of fluid flow at said given point;
   a reservoir for receiving and temporarily storing the fluid that has flowed past that given point for release therefrom at a variable demand rate;
   means responsive to the volume of fluid within the reservoir for blocking the flow of fluid past that given point when the volume of fluid in the reservoir reaches a predetermined high level and for allowing said fluid flow past said given point at a sustained rate when the volume of fluid in the reservoir reaches a predetermined low level to refill the reservoir; and,
   means for integrating the flow rate measured by the measuring means to provide an output indicative of the total amount of fluid flow past said given point;
   said means responsive to the volume of fluid within the reservoir including a gate valve having a normally closed position for blocking fluid flow from said given point into said reservoir and an open position for allowing fluid flow past said given point at a sustained rate into said reservoir; and, means including a Belleville washer capable of assuming either two alternative positions for opening and closing said gate valve means, said Belleville washer being snapped by said bellows arrangement to one of said alternate positions to open said gate valve when the fluid volume in the reservoir reaches a predetermined low level and said Belleville washer being snapped by said bellows arrangement to the other alternative position to close said gate valve when the fluid volume in the reservoir reaches said predetermined high level.

2. The system of claim 1 wherein:
   said bellows arrangement is spring loaded to expand the volume of fluid within the reservoir when said gate valve is open to produce a fluid flow rate past said given point at said sustained rate to refill the reservoir; and
   the fluid pressure within the reservoir is applied to the interior surfaces of said bellows arrangement and the fluid pressure upstream of said given point is applied to the exterior surfaces of said bellows arrangement to produce a net force on said bellows arrangement when the gate valve is closed for decreasing the fluid volume in said reservoir.

3. A system for measuring the amount of fluid flow from a storage container past a given point to an outlet means comprising:
   means for measuring the rate of fluid flow at said given point;
   reservoir means defining a fluid enclosure having a fixed volume;
   movable partition means disposed within said enclosure dividing the fixed volume into first and second oppositely variable reservoir volumes, said first reservoir volume being connected to receive fluid from a point upstream of said given point and said second reservoir volume being connected to receive fluid downstream of said given point, whereby said first and second reservoir volumes are filled with fluid and the upstream and downstream fluid pressures are applied to opposite sides of said partition means;
   means responsive to the position of said movable partition means for blocking the fluid flow past said given point into said second reservoir volume when the second reservoir volume reaches a predetermined high level until it decreases to a predetermined low level and for permitting said fluid flow at a sustained substantially constant rate past said given point when the second reservoir volume reaches said predetermined low level while said second reservoir volume is increased to said predetermined high level; and
   means for integrating the flow rate measured by the measuring means to provide an output indicative of the total fluid quantity that passes said given point.

4. The system of claim 3 wherein:
   said measuring means is a flowmeter having an impeller wheel transducer disposed at said given point to rotate at a speed proportional to said flow rate.

5. The system of claim 3 wherein:
   said partition means constitutes an expansible bellows disposed within the fluid enclosure of said reservoir means to define a fluid tight separation between said first and second reservoir volumes, said bellows expanding and contracting as the fluid volume within said second reservoir volume increases and decreases.

6. The system of claim 5 wherein said means responsive to the position of said partition means includes:
   a gate valve having a normally closed position for blocking fluid flow from said given point into said second reservoir volume and a fully open position for permitting said flow at a sustained rate; and,
   toggle means capable of assuming either of two alternative positions for opening and closing said gate valve means, said toggle means being snapped to one of said alternative positions to open said gate valve when the fluid volume in said second reservoir reaches a predetermined low level and being snapped to the other alternative position to close said gate valve when the fluid volume in said second reservoir volume reaches said predetermined high level.

7. The system of claim 6 wherein:
said bellows arrangement is spring loaded to expand the volume of fluid within said second reservoir volume and decrease the volume of fluid within said first reservoir volume when said gate valve is opened, the spring loading of said bellows arrangement being sufficient to overcome the fluid pressure differential between said first and second reservoir volumes to produce a net force on said bellows to increase said second reservoir volume when the gate valve is open and to decrease it when the gate valve is closed.

8. The system of claim 3 wherein:
said measuring means comprises a flowmeter for generating pulses at a frequency proportional to the flow rate at said given point;
gating means responsive to a control signal for passing only a selected proportion of the pulses generated by said flowmeter;
control means for generating said control signal for selectively controlling the proportion of the pulses passed by said gating means in inverse proportion to the density of the fluid flow; and
means connected to said gating means for registering the total number of pulses passed by said gating means.

9. The system of claim 8 wherein:
said control means includes a multivibrator circuit having its output connected to control said gating means with its "on" state permitting the passage of pulses by said gating means and its "off" state blocking the passage of pulses, the ratio of the duration of time interval of the "on" state to the duration of said "off" state being selectively variable in accordance with the density of said fluid.

10. The system of claim 9 wherein:
said control means includes a temperature sensing means disposed in the fluid flow adjacent said given point, said temperature sensing means being connected in circuit with said multivibrator to selectively vary the duration of the "on" state of said multivibrator in inverse proportion to the temperature of said fluid.

References Cited

UNITED STATES PATENTS

| | | | |
|---|---|---|---|
| 1,968,293 | 7/1934 | Gould | 73—198 |
| 3,076,337 | 2/1963 | Gehre | 73—199 |
| 3,176,514 | 4/1965 | Foster | 73—229 |
| 1,676,444 | 7/1928 | Kitchen | 73—199 |
| 2,784,590 | 3/1957 | Stewart | 73—199 |
| 3,221,550 | 12/1965 | Yashima | 73—199 |
| 3,288,197 | 11/1966 | Rose | 73—199 X |

RICHARD C. QUEISSER, *Primary Examiner.*

EDWARD D. GILHOOLY, *Assistant Examiner.*

U.S. Cl. X.R.

73—231, 290, 113